US012199837B2

United States Patent
Gupta et al.

(10) Patent No.: US 12,199,837 B2
(45) Date of Patent: Jan. 14, 2025

(54) VISUALIZATION OF SEGMENTED NETWORK

(71) Applicant: Illumio, Inc., Sunnyvale, CA (US)

(72) Inventors: Kuhu Gupta, Sunnyvale, CA (US); Joy Anne Scott, Los Altos, CA (US); Lawrence Wilson Chen, Sunnyvale, CA (US); Brian Staats, Redmond, WA (US); Ambika Yadav, Seattle, WA (US)

(73) Assignee: Illumio, Inc., Sunnyvale, CA (US)

( * ) Notice: Subject to any disclaimer, the term of this patent is extended or adjusted under 35 U.S.C. 154(b) by 0 days.

(21) Appl. No.: 18/489,836

(22) Filed: Oct. 18, 2023

(65) Prior Publication Data
US 2024/0129205 A1 Apr. 18, 2024

Related U.S. Application Data
(60) Provisional application No. 63/417,262, filed on Oct. 18, 2022.

(51) Int. Cl.
*H04L 41/22* (2022.01)
*H04L 41/12* (2022.01)

(52) U.S. Cl.
CPC .................................. *H04L 41/22* (2013.01)

(58) Field of Classification Search
CPC .......... H04L 41/22; H04L 41/12; H04L 63/00
See application file for complete search history.

(56) References Cited

U.S. PATENT DOCUMENTS

| | | | |
|---|---|---|---|
| 2003/0180042 A1* | 9/2003 | Nelles | H04L 41/12 398/29 |
| 2004/0158780 A1* | 8/2004 | Conrad | H04L 41/22 714/100 |
| 2009/0327903 A1* | 12/2009 | Smith | H04L 41/12 715/737 |
| 2016/0335787 A1* | 11/2016 | Martin | G06F 11/32 |
| 2017/0111236 A1* | 4/2017 | Bielenberg | G06F 9/45558 |
| 2020/0106741 A1* | 4/2020 | Fandli | H04L 41/40 |
| 2020/0169475 A1* | 5/2020 | Nagarkar | H04L 41/22 |
| 2021/0226865 A1* | 7/2021 | Gupta | H04L 43/062 |
| 2023/0023956 A1* | 1/2023 | Gajjar | H04L 43/045 |

FOREIGN PATENT DOCUMENTS

CN          112019801 A  * 12/2020  ......... H04L 41/0816

\* cited by examiner

*Primary Examiner* — Alina A Boutah
(74) *Attorney, Agent, or Firm* — Fenwick & West LLP

(57) ABSTRACT

A hybrid tree and network visualization represents a segmented computer network. The visualization presents an overview of the segmentation as a hierarchy and displays connections within the network. Using the visualization, analysts can explore a segmented network, identify nodes and connections of interest through exploratory network analysis, and drill down on elements of interest to reason about the patterns of relationships in the network. Thus, analysts can intuitively obtain a deeper understanding of the network to identify potential security threats and other problems as well as write better segmentation policies.

20 Claims, 9 Drawing Sheets

VISUALIZATION OF SEGMENTED NETWORK

CROSS-REFERENCE TO RELATED APPLICATIONS

This application claims the benefit of U.S. Provisional Patent Application No. 63/417,262, filed Oct. 18, 2022, which is incorporated by reference herein.

BACKGROUND

Technical Field

This application relates generally to network segmentation and, in particular, to a technique for visualizing a segmented network.

Problem

Network analysts divide their networks into segments (or parts) with similar security needs to write security policies. Segmentation makes writing security policies manageable and identifies robust security policies for the network. However, for large networks, it can be difficult for network analysts to understand the network flows within the network and how nodes in the network are behaving.

Visualizations can help network analysts understand how the network is operating, but due to the large amount of data that may be relevant, many existing visualizations are incomplete, confusing, or both. This is particularly the case where screen real estate on the devices used by network analysts are limited, such as when the network is being visualized on a laptop, tablet, smartphone, or other device with a small display (relative to potentially large stand-alone monitors).

SUMMARY

An interactive hybrid tree and network visualization is used to display a representation of a segmented computer network. The interactive visualization presents an overview of the segmentation as a hierarchy and displays connections within the network. Using the interactive visualization, analysts can explore a segmented network, identify nodes and connections of interest through exploratory network analysis, and drill down on elements of interest to reason about the patterns of relationships in the network. Thus, analysts can intuitively obtain a deeper understanding of the network to identify potential security threats and other problems as well as write better segmentation policies. Furthermore, the interactive visualization may present potentially large amounts of data in a manner that makes efficient use of available screen real estate.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
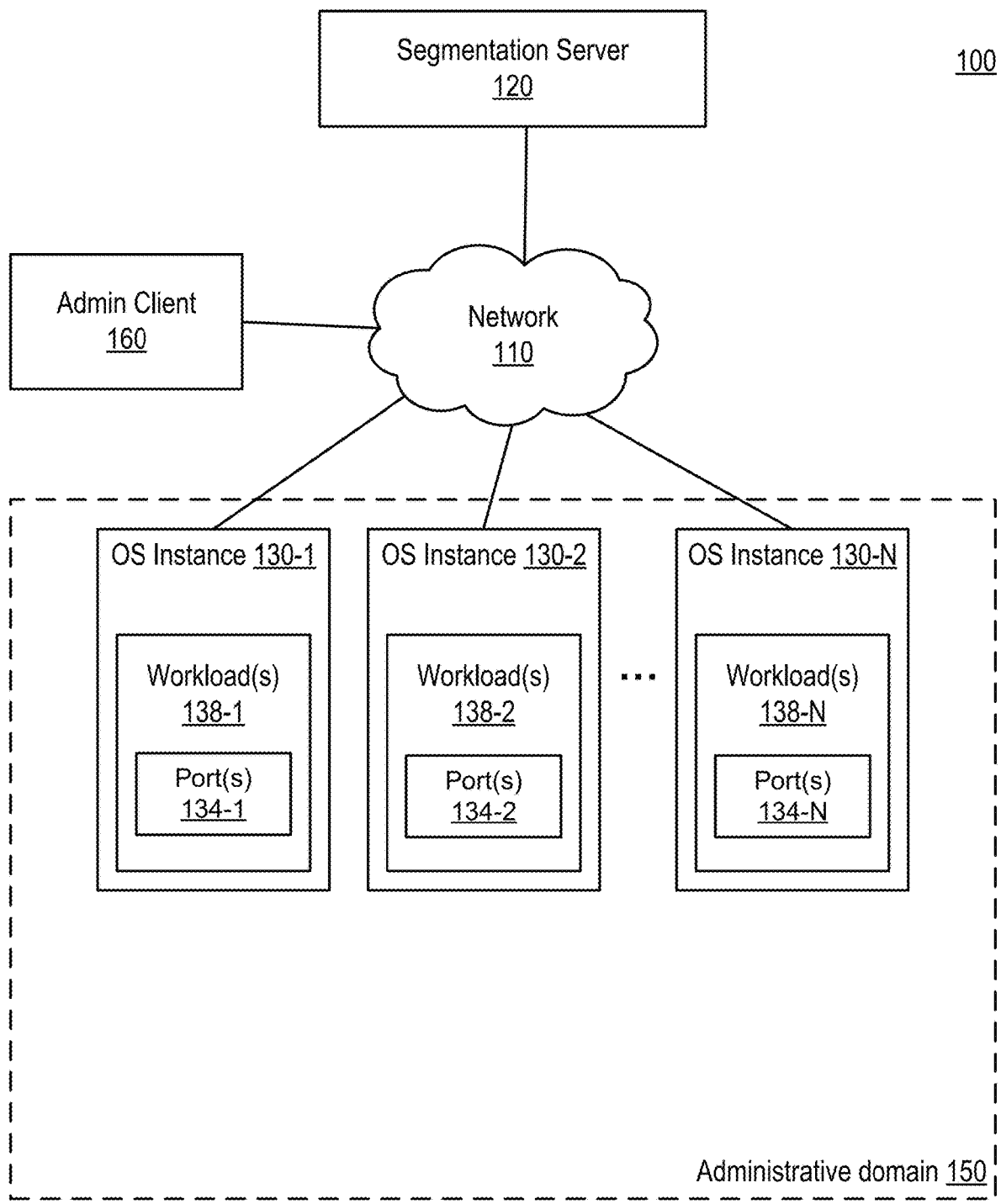
FIG. 1 is a high-level block diagram illustrating a networked computing environment for managing and visualizing a segmentation policy, according to one embodiment.

FIG. 1 illustrates one embodiment of a networked computing environment 100. In the embodiment shown, the networked computing environment 100 includes a segmentation server 120, a network 110, an administrative client 160, and an administrative domain 150 that includes a plurality of operating system (OS) instances 130 (e.g., OS instances 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130 The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 that may be independently addressable and may perform different independent computing functions. The workloads 138 on the OS instances 130 may communicate with other workloads 138 on different OS instances 130 within the administrative domain 150 to perform various tasks.

A workload 138 communicates over one or more ports 134. A port 134 comprises a logical communication endpoint for a particular service that is provided by or used by a workload 138. A port 134 on a workload 138 may be identified by a port identifier that may specify, for example, an IP address associated with the workload 138 and a port number. Specific port numbers may be used consistently across different workloads 138 in association with specific services. Thus, the port number can often identify the service and vice versa. For example, port 80 is typically used for hyper-text transfer protocol (HTTP) traffic on any workloads 138 that provide or consume HTTP-based web services and port 5432 is typically used for any TCP traffic associated with PostgreSQL database services. In other instances, the same services on different workloads 138 may utilize different port numbers that are not necessarily consistent, or different services may utilize the same port numbers.

The segmentation server 120 is a computer (or set of computers) that obtains and stores information about the OS instances 130 on the network 120 and the workloads 138 executing on the OS instances 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the managed server.<br>V: Engineers, Contractors, Managers, System Administrators |

Workloads 138 may be logically grouped based on their respective label sets. An "application group" may be defined as a group of workloads 138 having the same label values for a predefined subset of label dimensions without necessarily having the same values in the other dimensions. For example, in one embodiment, an application group could be defined to include all workloads having the same label values in each of the "environment" and "application" dimensions. Alternatively, an application group could be defined to include all workloads having the same label values in each of the "environment," "application" and "location" dimensions. A "tier" may be defined as a group of workloads 138 within an application group that have the same label value for at least one additional label dimension distinct from the label dimensions defining the application group. For example, a tier may be defined as group of workloads 138 having the same label values for the "environment," "application," and "role" labels. Alternatively, a "tier" may be defined as a group of workloads 138 having the same label values for the "environment," "application," "role," and "location" dimensions. In some embodiments, the specific label dimensions used to define an application group and a tier may be configurable by an administrator.

The segmentation server 120 may use label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions. For example, the segmentation policy may specify rules that control communications between specified application groups or between specified tiers.

The segmentation server 120 may retain a repository storing information about the OS instances 130 and the workloads 138 managed by the segmentation server 120. For example, the segmentation server 120 may store, for each OS instance 130, an OS instance identifier that uniquely identifies the OS instance 130, workload identifiers for workloads 138 associated with the OS instance 138, and membership information indicating one or more groups of workloads 138 to which each workload 138 belong (e.g., as defined by the respective label sets for the workloads 138).

Table 2 illustrates an example of information stored by the segmentation server 120. Here, the "ID" represents the OS instance identifier for each OS instance 130. The workload ID(s) represent the workload identifier for the workload(s) 138 executing on each OS instance 130. If only a single workload executes on a particular OS instance 130, the workload ID may be synonymous with the OS instance ID (e.g., in the case of ID1 and IDn). If more than one workload 138 executes on a given OS instance 130, the workload ID may include the OS instance ID in combination with a sub-identifier for the workload 138 (e.g., in the case of ID2). The sub-identifier may comprise, for example, an IP address or other identifier that uniquely identifies the workload 138 when taken in combination with the identifier for the OS instance 130. The memberships represent groups to which one or more workloads 138 executing on the OS instance 130 belongs. Each group may correspond to a unique label set involving one or more dimensions (e.g., a combination of labels representing an application group, tier, or other group).

TABLE 2

Example of a Repository Table

| OS Instance ID | Workload ID(s) | Memberships |
| --- | --- | --- |
| ID1 | ID1 | A, C, D |
| ID2 | ID2 + subID1 | B, C |
|  | ID2 + subID2 | D |
| . | . | . |
| . | . | . |
| . | . | . |
| IDn | IDn | B, D, E, F |

Instead of enforcing the segmentation policy at a centralized device, the segmentation policy is instead enforced by at least a subset of the OS instances 130. To enable enforcement of the segmentation policy, the segmentation server 120 generates a set of management instructions and distributes the management instructions to the OS instances 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different OS instances 130 so that each OS instance 130 gets only the management instructions relevant to its operation. Here, the segmentation server 120 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation server 120 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130.

In various embodiments, the segmentation server 120 generates a visualization of the segmented network for display. The visualization may be displayed at the segmentation server 120 (e.g., on a screen) or provided to another computing device (e.g., the administrative client 160) for display.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy and view visualizations of the network. The interface may furthermore enable the administrator to obtain various information about the OS instances 130 and workloads 138 on the network 120 and view traffic flows between the workloads 138.

Figure 2:
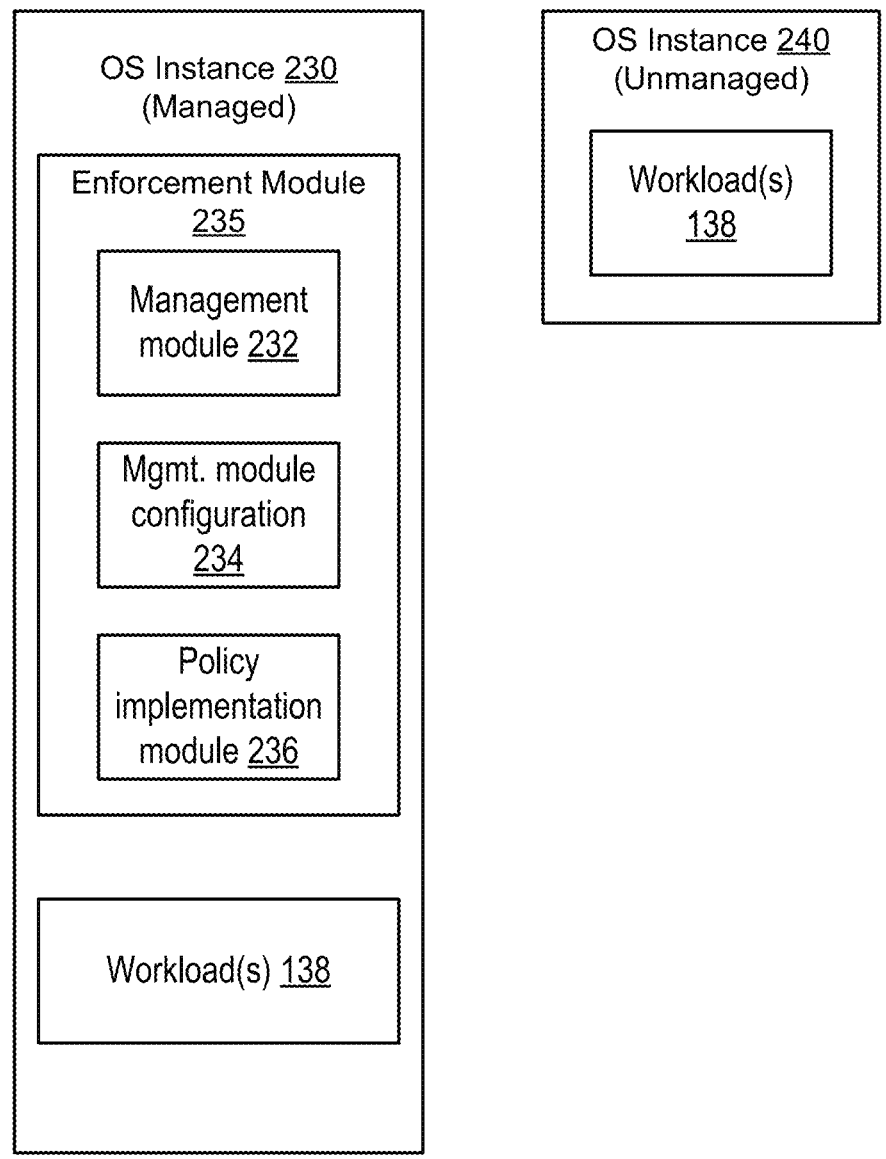
FIG. 2 is a block diagram illustrating example operating system instances within the networked computing environment of FIG. 1, according to one embodiment.

FIG. 2 illustrates example embodiments of OS instances 130. An OS instance 130 may correspond to a managed OS instance 230 or an unmanaged OS instance 240. A managed OS instance 230 includes an enforcement module 235 that enables the managed OS instance 230 to enforce the segmentation policy for the workloads 138 it executes. In contrast, the unmanaged OS instance 235 does not include an enforcement module 235 and is unable to directly contribute to enforcement of the segmentation policy. The segmentation server 120 thus only distributes management instructions to the managed OS instances 230. Nevertheless, the unmanaged OS instances 240 may still be affected by the segmentation policy because the managed OS instances 230 may limit communications of its workloads 138 with workloads 138 on the unmanaged OS instance 240. Workloads 138 executing on the unmanaged OS instances 240 may be assigned labels and may be referenced in the rules of the segmentation policy in the same way as workloads 138 on managed OS instances 130. Thus, communications between workloads 138 on managed OS instances 230 and unmanaged OS instances 240 may be controlled by the segmentation policy by enforcing the rules at the managed OS instances 230.

In some embodiments, the segmentation policy may be effectively enforced on an unmanaged OS instance 240 by a separate device that can control communications to and from the unmanaged OS instance 240 on which workloads 138 execute. For example, an enforcement module 235 on an upstream switch port or other device may control communications to and from workloads 138 on a downstream unmanaged OS instance 240. In this case, the segmentation policy can be enforced directly on the workloads 138 on an unmanaged OS instance 240 similarly to enforcement on a managed OS instance 230.

The enforcement module 235 includes a management module 232, a management module configuration 234, and a policy implementation module 236. The management module 232 comprises a low-level network or security engine that controls incoming and outgoing traffic associated with each of the workloads 138 executing on the OS instance 130. For example, the management module 232 may include an operating system-level firewall, an Internet Protocol security (IPsec) engine, or a network traffic filtering engine (e.g., based on the Windows Filtering Platform (WFP) development platform). The management module 132 on a given managed OS instance 230 restricts communications to or from the workloads 138 executing on the given managed OS instances 230 based on the management module configuration 134. For example, the management module 232 may permit a particular workload 138 to communicate with a limited set of workloads 138 on other OS instances 130, and may block all other communications. Furthermore, the management module 232 may place restrictions on how each workload 138 is permitted to communicate. For example, for a particular workload 138, the management module 232 may enable the workload 138 to communicate using only encrypted protocols and block any unencrypted communications.

The policy implementation module 236 receives the management instructions from the segmentation server 120 and translates the management instructions from a high level of abstraction to a low level of abstraction represented by the management module configuration 234. For example, the policy implementation module 236 may obtain the relevant rules and relevant membership information from the management instructions, and identify the specific workloads 138 and services controlled by the rules. The policy implementation module 236 then generates a management module configuration 234 that enables the management module 232 to enforce the management instructions.

Figure 3:
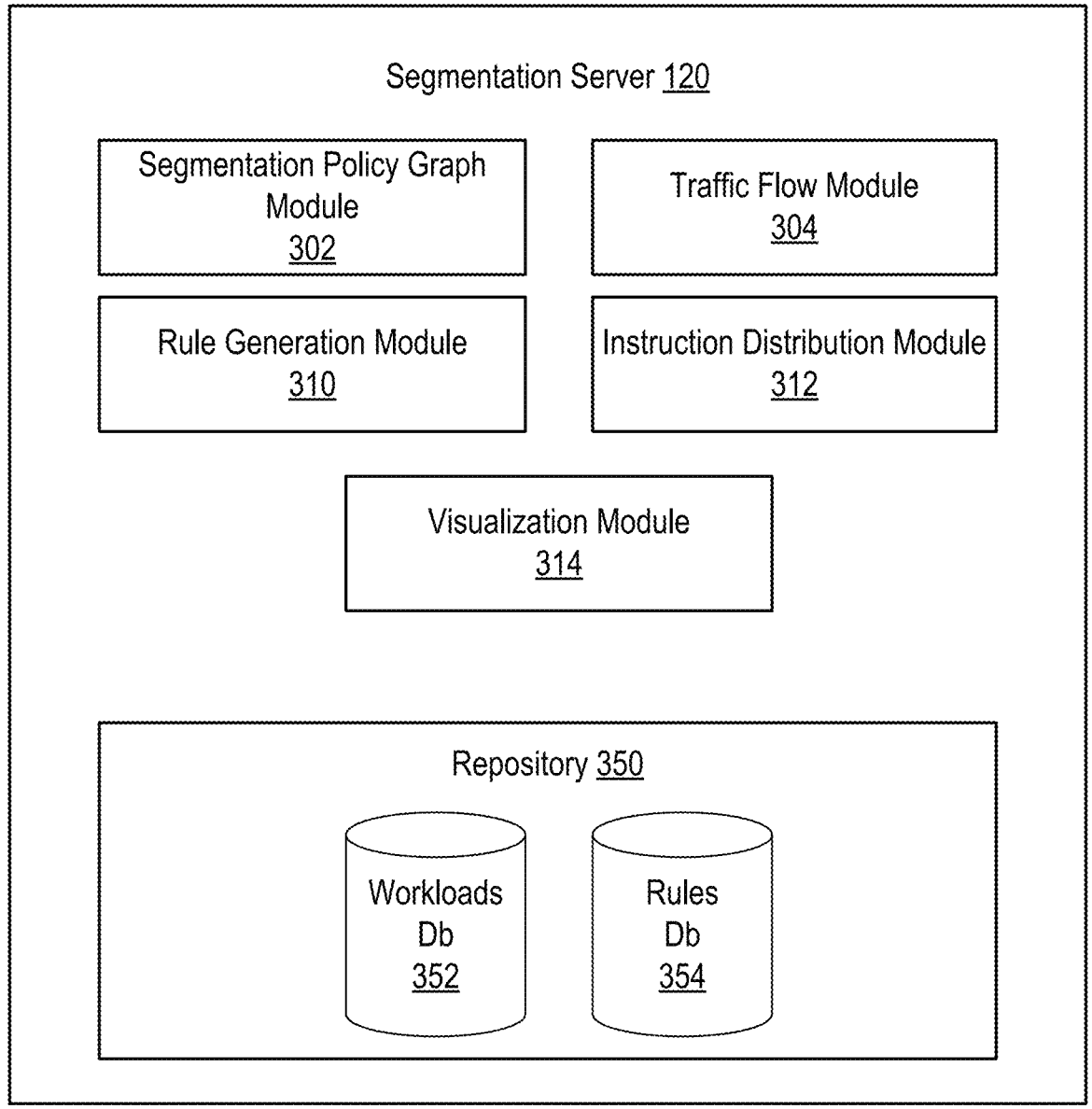
FIG. 3 is a block diagram illustrating the segmentation server of FIG. 1, according to one embodiment.

FIG. 3 illustrates one embodiment of the segmentation server 120. In the embodiment shown, the segmentation server 120 includes a segmentation graph module 302, a traffic flow module 304, a rule generation module 310, an instruction distribution module 312, a visualization module 314, and a repository 350. The repository 350 may include a workloads database 352 that stores associations between workloads 138 and their respective label sets and a rule database that stores a segmentation policy as a set of rules. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The segmentation policy graph module 302 generates a segmentation policy graph comprising a data structure representing the permitted (but not necessarily observed) connections between workloads 138 under the segmentation policy. In the segmentation policy graph, each workload 138 is represented by a node and permitted connections between workloads 138 are represented by edges between the respective nodes. The nodes may store information relating to the workloads 138 and the edges may store information relating to the permitted traffic between the workloads such as the permitted port numbers, protocols, and services permitted between the workloads 138.

The segmentation policy graph module 302 may generate a segmentation policy graph that is limited to workloads within the scope of a specified label set. For example, the segmentation policy graph module 302 may generate a segmentation policy graph for a specific application group that is limited to rules affecting workloads 138 in the application group or may generate a segmentation policy graph for a specific tier that is limited to rules affecting workloads 138 within the specified tier.

The segmentation policy graph module 302 may furthermore generate segmentation policy graphs at different levels of abstraction. For example, the segmentation policy graph module 302 may generate a tier-level segmentation policy graph in which tiers of workloads 138 are represented as nodes and a permitted connection between one or more pairs of workloads 138 in different tiers are represented as edges between the nodes. In this representation, an edge exists between a first tier and a second tier if a rule permits a connection between any workload 138 in the first tier and any workload 138 in the second tier. Similarly, the segmentation policy graph module 302 may generate an application-level segmentation policy graph in which application groups are represented as nodes and a permitted connection between one or more pairs of workloads 138 in different application groups are represented as edges between the nodes. In this representation, an edge exists between a first application group and a second application group if a rule permits a connection between any workload 138 in the first application group and any workload 138 in the second application group.

The traffic flow module 304 monitors traffic between workloads 138 and presents information relating to the traffic flows. For example, the traffic flow module 304 may identify each pair of workloads 138 that communicate with each other during a particular time period. For each detected traffic flow between a pair of workloads 138, the traffic flow module 304 may identify what services are communicated between the pair of workloads 138 and the corresponding ports 134 and protocols used in the communications. Furthermore, the traffic flow module 304 may identify statistical information relating to the traffic flow between a pair of workloads 138 such as, for example, a volume of data transferred between the pair of workloads within a particular time period, a frequency of communications between the pair of workloads 138, a duration of communications between the pair of workloads 138, or other statistical information indicative of the extent of the communications. For the purpose of monitoring the traffic flows, the traffic flow module 304 may operate under a very permissive segmentation policy (e.g., enabling all workloads 138 in the administrative to communicate with all workloads 138 over all ports and protocols) so that the traffic flows are representative of the normal operation of the workloads 138 in the administrative domain 150.

The traffic flow module 304 may generate a data structure representing the traffic flows in the form of a traffic flow graph in which each workload 138 is represented by a node and a traffic flow between a pair of workloads 138 is represented by an edge connecting the respective nodes corresponding to the connected pair of workloads 138. The nodes may store information relating to the workloads 138 and the edges may store information relating to the traffic flow such as the port number, service, process, protocol, or combination thereof associated with the traffic flow. In an embodiment, the traffic flow graph may be limited to traffic flows meeting predefined criteria. For example, the traffic flow graph may be limited to traffic flows meeting a predefined threshold volume of the traffic (e.g., amount of data, frequency, duration, or a combination thereof). Thus, pairs of workloads 138 having only very limited or sporadic communications may be omitted from the traffic flow graph.

The traffic flow module 304 may generate a traffic flow graph that is limited to workloads within the scope of a specified label set. For example, the traffic flow module 304 may generate a traffic flow graph for a specific application group that is limited to traffic flows involving workloads 138 in the application group. In another example, the traffic flow module 304 may generate a traffic flow graph for a specific tier that is limited to traffic flows involving workloads 138 within the specified tier.

The traffic flow module 304 may furthermore generate traffic flow graphs at different levels of abstraction. For example, the traffic flow module 304 may generate a tier-level traffic flow graph in which tiers of workloads 138 are represented as nodes and an observed connection between one or more pairs of workloads 138 in different tiers are represented as edges between the nodes. In this representation, a first tier is considered connected to a second tier if a traffic flow is observed between any workload 138 in the first tier and any workload 138 in the second tier. Similarly, the traffic flow module 304 may generate an application-level traffic flow graph in which application groups are represented as nodes and an observed connection between one or more pairs of workloads 138 in different application groups are represented as edges between the nodes. In this representation, a first application group is considered "connected" to a second application group if a traffic flow is observed between any workload 138 in the first application group and any workload 138 in the second application group.

The edges in a traffic flow graph and a segmentation policy graph may overlap to varying degree depending on how permissive the segmentation policy. For example, in a highly permissive segmentation policy, the number of edges in the segmentation policy graph may be significantly more than the number of edges in the traffic flow graph because only a subset of the permitted connections are actually utilized by the workloads 138. In a less permissive segmentation policy, the number of edges in the segmentation policy graph may be similar to or the same as the number of edges in the traffic flow graph because the segmentation policy only permits traffic close to that observed.

The rule generation module 310 automatically generates or updates a segmentation policy comprising a set of rules. The particular strategy for generating the rules may be based on configuration settings, the observed traffic graph, known or detected vulnerabilities, or a combination thereof. In general, the rule generation module 310 generates rules that when enforced will allow at least the traffic flows in the traffic flow graph. The rules may also allow traffic flow beyond that specifically observed in the traffic flow graph depending on the level of permissiveness specified in the configuration settings and any known of identified vulnerabilities. For example, the rule generation module 310 may generate the most permissive rules allowed by the configuration settings that do not unnecessarily expose an identified vulnerability. Generating rules based on the observed traffic flow graph is beneficial because, assuming that there are no abnormal or malicious communications in the administrative domain 150 in the observed traffic flow graph, the rule generation module 310 can produce a set of rules that permits communications observed during normal operation of the workloads 138 in the administrative domain 150 while blocking or limiting abnormal communications that are potentially malicious. Furthermore, by limiting rules based on the discovered vulnerabilities, the rule generation module 310 may reduce the exposure to a known vulnerability by limiting overly permissive rules.

The rule generation module 310 may generate rules based on different segmentation strategies depending on configuration parameters. For example, under a port-level granularity segmentation strategy, the rule generation module 310 generates a set of rules that only permits communications between pairs of workloads 138 using the specific ports and protocols observed in the traffic flows. Thus, for example, if the traffic flow module 304 only observes communications between a first workload $W_1$ and a second workload $W_2$ using port P, a rule will be generated that permits communications between the first workload $W_1$ and the second workload $W_2$ only over port P without permitting communications over other ports. In an embodiment, the generated rule may be specified to apply to particular groups of workloads 138 in which the respective workloads in the pair have memberships. For example, the rule may specified in accordance with respective label sets of the pair of workloads along a predefined set of dimensions (e.g., the dimensions defining a tier). As a result, the rule will also permit communications conforming to the specified ports and protocols between different pairs of workloads that conform to the same respective label sets along the same predefined set of dimensions (e.g., the same respective tiers) as the observed pair of workloads. For example, a rule may be generated that permits workloads 138 in a first tier associated with the label set "App: Point of Sale; Environment: PCI; Role: Database" to provide a service on port 5432 using TCP protocol to workloads 138 in a second tier associated with the label set "App: Point of Sale: Environment: PCI; Role: Processing."

In a workload-level granularity segmentation strategy, the rule generation module 310 generates rules that enable communications between groups of workloads 138 that are observed as being connected in the traffic flow graph, without limiting the rules to specific ports or protocols. For example, if a connection is observed between a workload 138 in a first group of workloads 138 and a workload 138 in a second group of workloads 138, a rule is generated to permit communications between workloads 138 in the first group and workloads in the second group. Here, the group to which the rule generating applies may be preconfigured and may be based on a label set along a predefined set of dimensions. For example, under one configuration, this strategy may generate a rule may that permits workloads 138 in a first tier associated with the label set "App: Point of Sale; Environment: PCI; Role: Database" to provide any service (using any port and any protocol) to workloads 138 in a second tier associated with the label set "App: Point of Sale: Environment: PCI; Role: Processing" if any traffic flows are observed between the first and second tier in the traffic flow graph. Upon enforcement of the segmentation policy, communications between pairs of workloads that are not expressly permitted by the rules will be blocked.

Under other configuration settings, the rule generation module 310 may generate rules that permit communications between certain specified groups of workloads 138 (e.g., based on the label sets) independently of the observed traffic flows. For example, in a group-level granularity segmentation strategy, the rule generation module 310 generates a set of rules that permits communications between all workloads 135 in a predefined group (e.g., share a set of labels along a predefined set of dimensions) without regard to observed communications. For example, the rule generation module 310 may generate rules that permit communications between all workloads 138 within the same application group. For example, a rule may be generated that permits workloads 138 in an application group associated with the label set "App: Point of Sale; Environment: PCI" to provide any service (using any port and any protocol) to other workloads 138 in the application group. Upon enforcement of the segmentation policy, communications between pairs of workloads that are not expressly permitted by the rules will be blocked.

In another embodiment, configuration settings may cause the rule generation module 310 to generate rules permitting communications between specified groups of workloads 138. For example, under certain configuration settings, the rule generation module 310 may generate rules permitting communications between a first application group $A_1$ and a second application group $A_2$.

In an embodiment, rules may be generated differently for different groups of workloads 138 by specifying different configuration settings for different groups. For example, rules may be generated for workloads 138 in a first application group according to a workload-level granularity segmentation strategy while rules may be generated for workloads 138 in a second application group according to a port-level granularity segmentation strategy. Furthermore, rules controlling communications between different groups of workloads 138 may be generated according to different configuration settings. For example, rules controlling communications between workloads 138 in a first application group and workloads 138 in a second application group may be generated according to a workload-level granularity segmentation strategy while rules controlling communications between workloads 138 in a first application group and workloads 138 in a third application group may be generated according to a group-level granularity segmentation strategy.

In other embodiments, a segmentation strategy may be applied to generate rules in which workloads 138 are permitted to provide services according to a first segmentation strategy and are permitted to use services according to second segmentation strategy. For example, a segmentation strategy may generate rules that enable workloads 138 to provide services to any workloads 138 within an application group without regard to specific port or protocol (e.g., consistent with a group-level granularity segmentation strategy), but only enables workloads 138 to use services consistent with the ports and protocols in the observed traffic graph (consistent with a port-level granularity segmentation strategy).

In yet other embodiments, other variations of segmentation strategies or combinations thereof may be applied that do not necessarily conform to the port-level granularity, workload-level granularity, or group-level granularity strategies described above or the variations thereof discussed above.

The rule generation module 310 may modify an initial segmentation strategy based on new information (e.g., newly identified vulnerabilities) to reduce the number of permitted connections that may expose the administrative domain 150 to a vulnerability. If a segmentation policy enables communication over a vulnerable port, the segmentation strategy may be modified so that the resulting segmentation policy limits the permitted communications on the vulnerable port based on the observed traffic flow graph.

The instruction distribution module 312 generates the management instructions from the rules for a current segmentation policy and distributes the relevant management instructions to the OS instances 130 as described above. In an embodiment, the instruction distribution module 312 generates and distributes the relevant management instructions to the OS instances 130 upon approval from an administrator. Alternatively, the instruction distribution module 312 may automatically distribute the instructions upon being generated without necessarily requiring an additional approval.

The visualization module 314 generates one or more visualizations of the networked computing environment 100 for display. In one embodiment, a visualization can provide an overview of the segments and the connections in the networked computing environment 100. The overview may allow analysts to understand the network topology and identify patterns and trends, such as network nodes with many connections. Existing tools require a lot of drilling to view the traffic data at the lowest level and do not support a label hierarchy view of the workloads, the connections at the workload level, and the associated label level. In contrast, the generated visualization may provide some or all of these features.

Figure 4:
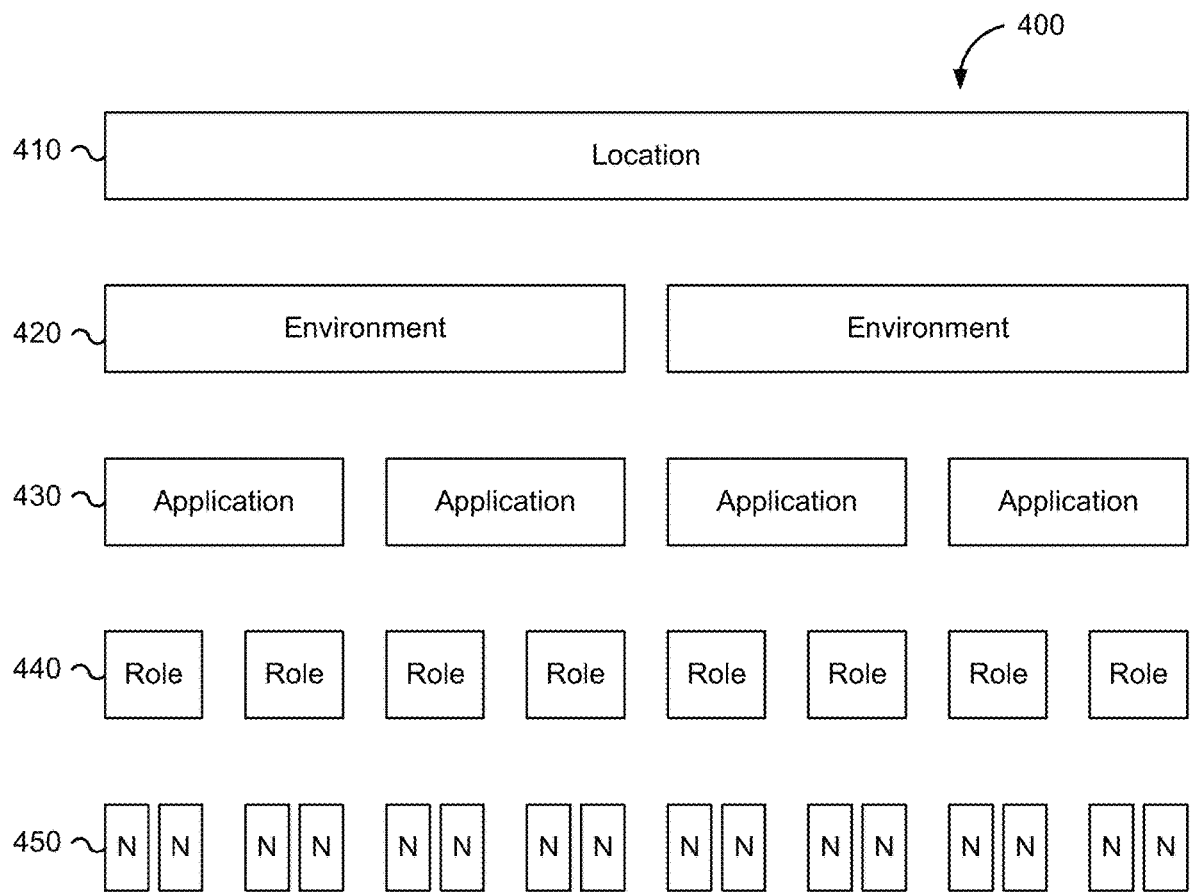
FIG. 4 illustrates a segment hierarchy model, according to one embodiment.

FIG. 4 illustrates one embodiment of a segment hierarchy 400 for nodes 450. A node 450 can be a workload operating within the network. Each node 450 is assigned labels indicating which segments in the other levels of the hierarchy 400 that node resides. In the embodiment shown, the hierarchy 400 has four levels: locations 410, environments 420, applications 430, and roles 440. The location label indicates the geographical or virtual location of the node. A given location may be subdivided into different environments (e.g., a production environment and one or more test environments), with the environment label indicating which o the environments within a location the node resides. Similarly, environments may be further broken down into applications (e.g., different functionality provided within the environment) and roles (e.g., permission sets selected by the function of nodes), each of which are indicated by the corresponding label. In other embodiments, the hierarchy 400 may have different or additional levels. It should be appreciated that any logical segmentation of the network into groups and subgroups organized in an arbitrarily deep hierarchy 400 may be defined using node labels in this way.

In the embodiment shown in FIG. 4, only one location is shown, which is divided into two environments, which are each divided into two applications, and which are each divided into two roles, with two nodes being assigned each unique set of labels. This is a convenient way to represent to concept of a hierarchical segmentation tree, but it should be appreciated that each level of the hierarchy 400 may include any number of the corresponding entities and any number of nodes may share the same set of labels. Similarly, some combinations of location, environment, application, and role may have no nodes assigned to them.

Flows within the network are data that is passed from a source node to a target node. A flow connects the source and target nodes on a particular port. Some nodes may be connected via more than one port at the same time. In various embodiments, the visualization includes geometric shapes representing each source and target node. For convenience, this disclosure refers to nodes and other components of the network being displayed in the visualization. This means that the corresponding geometric shape or other representation of that component is displayed, not that the component itself is displayed.

Source nodes may be displayed in a first portion of the visualization (e.g., on the left side) while target nodes may be displayed in a second portion of the visualization (e.g., on the right side). In each portion of the visualization, the nodes grouped according to the hierarchy 400 (e.g., such that nodes in the same location are grouped together, then sub-grouped by environment, then by application, and then by role).

Geometric shapes may also be used to represent each location, environment, application, and role (e.g., displayed encompassing or next to the nodes within them). Ports may be represented by geometric shapes in a third portion of the visualization (e.g., in the center, between the source and target nodes). Flows may be represented by lines connecting source and target nodes to the corresponding ports.

The visualization may enable selection and analysis of segments, nodes, connections, and ports of interest to write security policies. Using the visualization, an analyst may identify connections of interest by drilling down on the network's nodes, ports, and connections. After the analyst has identified an item of interest (e.g., an interesting node or a high-volume port), the analyst may interact with the visualization to view relationships between relevant workloads or segments and ports to evaluate the behavior of the item of interest in the context of the whole network.

The visualization may also enable the analyst to find core services. Generally, core services are ports where the number of source nodes is significantly higher than target nodes or vice versa. The visualization can provide an easy and intuitive way to identify such ports.

The visualization may also enable the analyst to identify anomalous connections. Analysts want to identify anomalies in the connections and visually explore many-to-many and one-to-many relationships within the network to identify anomalies and identify if something looks out of order. Patterns like DOS attack, Host Scan or slammer worms can be visually identified. Identifying unique traffic patterns may enable scanner detection as well.

The visualization may also include a vulnerability map. An analyst may identify the most and least vulnerable ports using vulnerability data layered over traffic data. This may in turn help identify vulnerable workloads and segments.

In one embodiment, the visualization uses a radial layered tree visualization to show the segment categories, which allows analysts to get an overview of the network segmentation and information about the roles of different nodes in the network. Placement of the network nodes in the center allows the connection with the port nodes that occupy the space between the source and target hierarchies. The visualization connects the leaf nodes of the source and target side of the hierarchy through the port nodes to present an overview of the network. The port nodes occupy the space between two semi-circular hierarchy sectors (corresponding to source and target nodes, respectively). The size of each port node maps to the total number of unique connections that pass through the port. The size encoding may make it easier to spot the ports with a high and low connection volume, which helps identify anomalies.

Figure 5A:
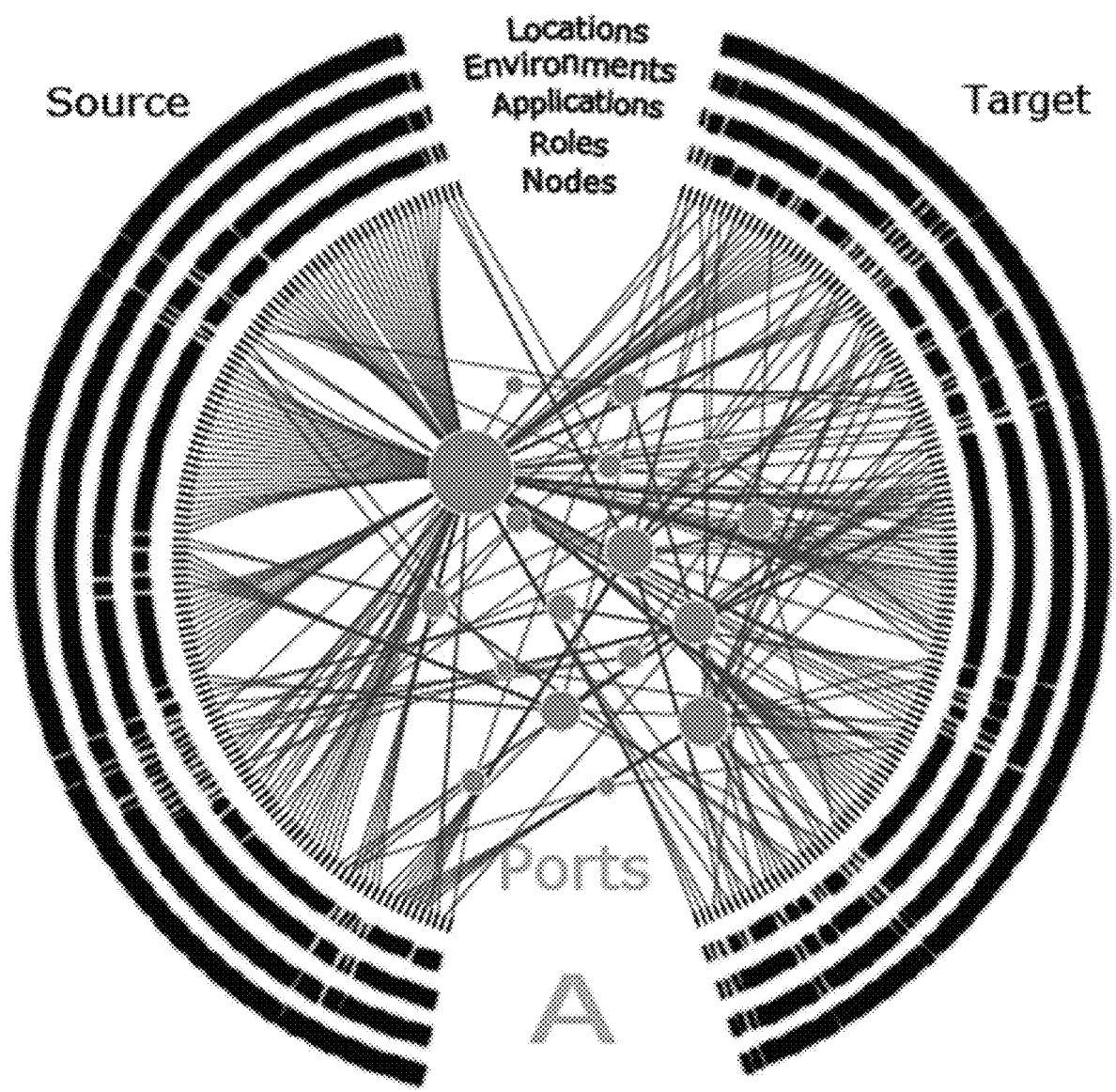
FIGS. 5A-5C illustrate an example interactive network visualization, according to one embodiment.
Figure 5B:
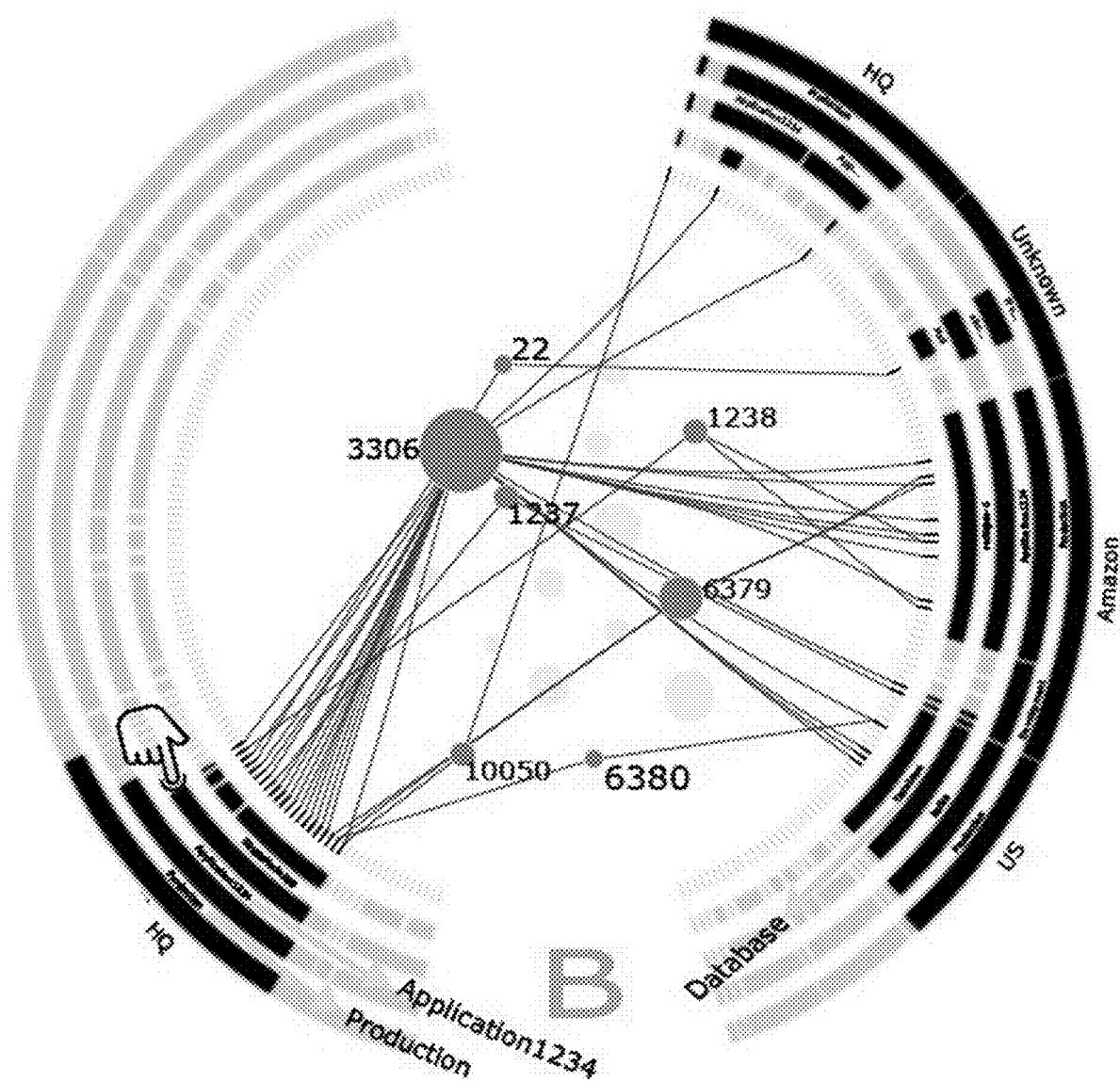
Figure 5C:
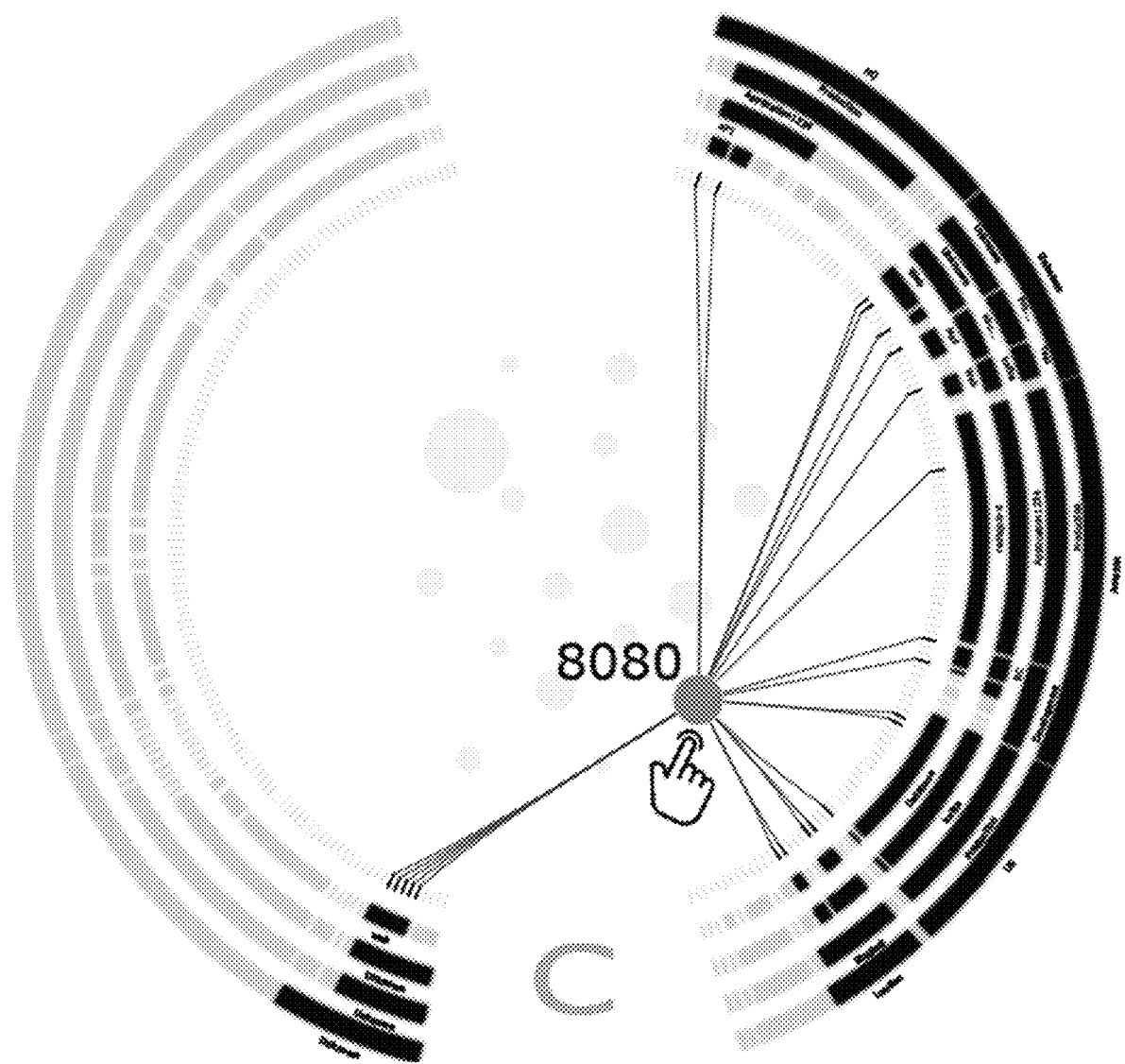

FIGS. 5A-C illustrate this radial layered tree embodiment of the visualization. FIG. 5A shows an initial state of the visualization before the user has made any selections. The source nodes are represented by segments of a radial arc on the left side of the visualization. A set of concentric arcs are arranged outside of the arc of nodes representing the roles, applications, environments, and locations. If one draws a line outwards (from the center of the visualization) through a given node, it intersects an arc segment that represents each label (role, application, environment, and location, in that order). Thus, the user can intuitively see which labels are applied to which nodes, and identify nodes that share some or all of the same labels. Similarly, a set of radial arcs representing target nodes, roles, applications, environments, and locations are arranged on the right side of the visualization.

A set of circles representing ports are arrange in the center of the visualization, between the representations of the source and target nodes. Flows are represented by lines connecting the source node to a port and the port to the target node. The number of connections to a port is indicated by the size of the corresponding circle.

The position of each port may be determined using a force-directed layout algorithm. The position of the source and target nodes may be fixed based on the applied labels. In contrast, the position of the ports may be determined by calculating x and y forces. The positioning force along the y-axis aligns the port nodes using the port numbers. For example, the lower-valued port numbers may be at the top of the visualization, while the higher-valued port numbers may be at the bottom. The position of ports along the x-axis may be determined from the number of source and target nodes to which it is connected. If a port connects to more source nodes (in-degree) than target nodes (out-degree), the port appears closer to the source nodes (or vice versa). In contrast, if a port connects to more target nodes than source nodes, the port appears closer to the target nodes (or vice versa). Thus, the horizontal position of the port enables the user to identify core services of the network. Edge bundling may be used to reduce the visual clutter caused by numerous edges in the network.

In some embodiments, the visualization includes interactive features that help users isolate items of interest for focused analysis. For example, an on-click interaction may allow selection of a subset of the segmented network. FIGS. 5B and 5C illustrates two on-click interaction modes, segment-focused and port-focused analysis, respectively. In segment-focused analysis, users can click on any node or label in the segment hierarchy to have nodes, labels, and ports that are connected to the selected node or label via connections or within the hierarchy be highlighted. Similarly, in port-focused analysis, the user can select a port to cause the highlighting of any nodes connected to the selected port (along with any associated labels).

FIG. 5B illustrates a specific example of segment-focused analysis. In the example shown, the user has selected a particular source label within the hierarchy. Specifically, the user has selected Application 1234 within the production environment. The entire subtree of the selected label (i.e., the direct ancestors and children of the selected label and all of the nodes having the selected label) is selected and highlighted. The ports that are connected to source nodes having the selected label are also selected and highlighted, as are target nodes connected to the selected source nodes (and any target labels that are assigned to at least one of the selected target nodes). A text representation of each selected label may also be appended to the view. In one embodiment, to prevent visual clutter, for the source and target nodes themselves, the text labels can be omitted. A user may hover over these items with a pointer or otherwise select them individually to see their labels. The numbers of the selected ports may also be displayed. Any ports, nodes, and labels that are not selected may be removed from the view entirely or otherwise de-highlighted (e.g., by being displayed in faded colors).

FIG. 5C illustrates a specific example of port-focused analysis. In the example shown, the user has selected a port (in this case, port 8080), and all the connections, nodes, and labels connected to the port are highlighted. The labels associated with the nodes and segments connected to the selected port are also displayed. As with FIG. 5B, the non-selected connections, nodes, and segments may be removed from display or de-highlighted (e.g., by using faded colors). Similarly, the user may hover over or otherwise select nodes individually to view additional information about them.

The selection of nodes and ports as illustrated in FIGS. 5A-C enables users to temporarily filter out items that are not connected to the selected segment, port, or node and focus on the items of interest. For example, by selecting a particular application, an analyst may quickly evaluate all incoming and outgoing traffic for that application and determine whether each identified flow makes sense. This provides an intuitive way to identify erroneous connections that exist with the network that may be causing performance or security issues, and shut them down. As another example, a network analyst may identify ports and nodes that have a high number of connections and consider configuration changes for the network to identify potential choke points that may be affecting performance and make appropriate configuration changes.

Example Method

Figure 6:
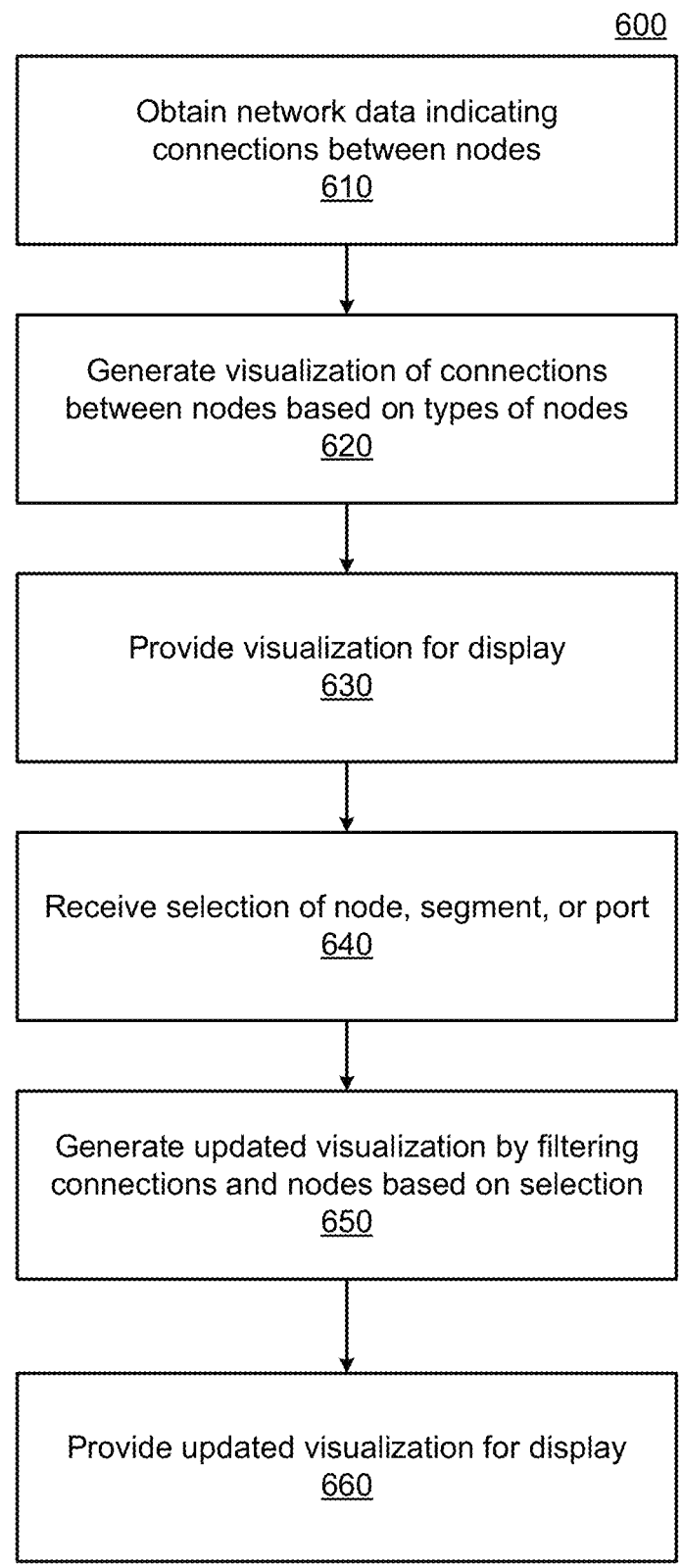
FIG. 6 is a flowchart illustrating a method for providing an interactive network visualization, according to one embodiment.

FIG. 6 illustrates an example method 600 for providing an interactive network visualization, according to one embodiment. The steps of FIG. 6 are illustrated from the perspective of the visualization module 314 performing the method 600. However, some or all of the steps may be performed by other entities or components. In addition, some embodiments may perform the steps in parallel, perform the steps in different orders, or perform different steps.

In the embodiment shown, the method 600 begins with the visualization module 314 obtaining 610 network data indicating connections between nodes 610 of different types. The different types of nodes can include whether the node is a source or a target (for a particular connection) as well as a hierarchy of labels (such as location, environment, application, role, etc.). The connections may be inferred by evaluating flows or provided by another component within the network (e.g., the enforcement modules 235 installed on workloads).

The visualization module 314 generates 620 the visualization of connections between nodes based on the types of the nodes, such as generating the example visualization shown in FIG. 5A. The visualization module 314 provides 630 the visualization for display. The visualization may be displayed on the same device that generates it or provided to a remote device for display. For example, the visualization may be generated by the segmentation server 120 and provided 630 to the admin client 160 for display.

The visualization module 314 receives 640 a selection of a node, segment, or port. The selection may be made by a user clicking or tapping on the node, segment, or port within the visualization and provided to the visualization module 314. The visualization module 314 generates 650 an updated visualization by filtering the connections and nodes based on the selection. For example, the filtering may be segment-focused and port-focused, as described previously with reference to FIGS. 5B and 5C. The visualization module 314 provides 660 the updated visualization for display. Thus, the visualization is interactive and can be used by the user to evaluate the network in an intuitive manner.

Computing System Architecture

Figure 7:
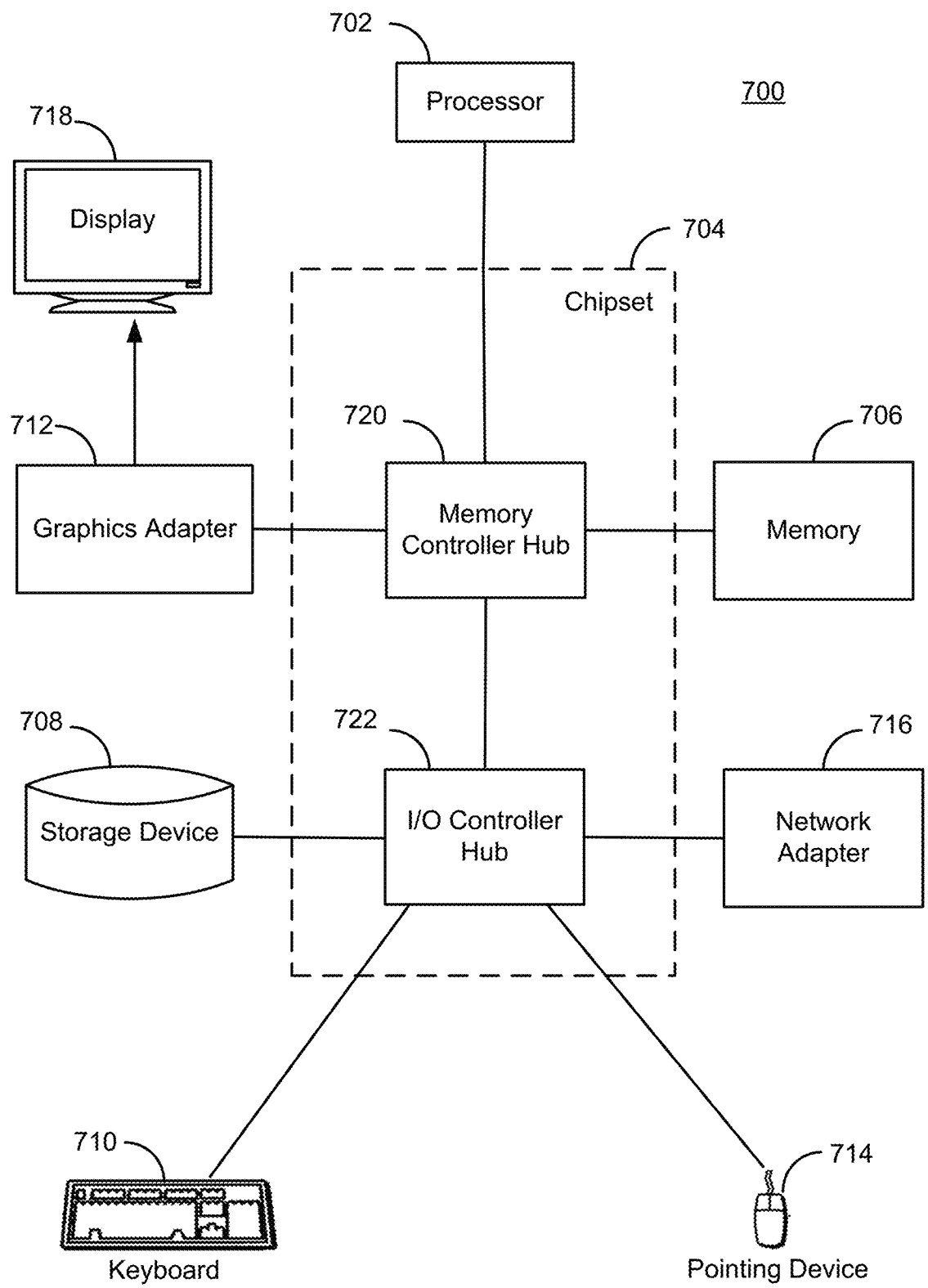
FIG. 7 is a block diagram illustrating an example of a computer suitable for use in the networked computing environment of FIG. 1, according to one embodiment.

FIG. 7 is a block diagram of an example computer 700 suitable for use in the networked computing environment 100 of FIG. 1. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touchscreen, or other type of pointing device, and may be used in combination with the keyboard 710 (which may be an on-screen keyboard) to input data into the computer system 700. The graphics adapter 712 displays images and other information on the display 718. The network adapter 716 couples the computer system 700 to one or more computer networks, such as network 110.

The types of computers used by the entities of FIGS. 1 through 3 can vary depending upon the embodiment and the processing power required by the entity. For example, the segmentation server 120 might include multiple blade servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for visualizing a segmented network. Thus, while particular embodiments and applications have been illustrated and described, it is to be understood that the described subject matter is not limited to the precise construction and components disclosed. The scope of protection should be limited only by the any claims that may issue.

What is claimed is:

1. A method for visualizing a segmented network, the method comprising:
obtaining data indicating connections between nodes in the segmented network by evaluating network traffic flows in the segmented network using enforcement modules installed on workloads in the segmented network;
generating a visualization having a first axis and a second axis, the visualization including:
a first set of geometric shapes representing source nodes are displayed in a first portion of the visualization;
a second set of geometric shapes representing target nodes are displayed in a second portion of the visualization; and
a third set of geometric shapes representing ports are displayed closer to the first portion along the first axis responsive to having a greater number of connections to source nodes than target nodes and closer to the second portion along the first axis responsive to having a greater number of connections to target nodes than source nodes; and
causing display of the visualization on a screen of a computing device.

2. The method of claim 1, wherein the ports are positioned along the second axis of the visualization based on a corresponding port number.

3. The method of claim 1, wherein a size of a particular geometric shape of the third set of geometric shapes is based on a total number of connections between the port represented by the geometric shape and the source nodes and target nodes.

4. The method of claim 1, wherein the first portion is a first side of the visualization and the second portion is a second side of the visualization, the second side opposite the first side with respect to the first axis.

5. The method of claim 1, wherein the visualization further includes lines representing connections in the network between the source and target nodes via the ports, wherein a connection between a particular source node and a particular target node via a particular port is represented by a first line connecting a first geometric shape that represents the particular source node to a second geometric shape that represents the particular port and a second line connecting the second geometric shape that represents the particular port to a third geometric shape that represents the particular target node.

6. The method of claim 1, wherein the visualization further includes additional geometric shapes indicating labels from a segmentation hierarchy applied to at least some of the source nodes and target nodes, wherein the additional geometric shapes identify a subset of the first set of geometric shapes and second set of geometric shapes that represent source nodes or target nodes each sharing a corresponding label.

7. The method of claim 6, wherein the first set of geometric shapes or the second set of geometric shapes are arranged in a first arc, and at least one of the additional geometric shapes is arranged along a second arc, adjacent to the first arc, and has a length along the second arc that spans a plurality of the first or second set of geometric shapes, thus indicating that the plurality of the first or second set of geometric shapes share the corresponding label.

8. The method of claim 1, further comprising:
receiving a selection of a label that is applied to a subset of the source nodes and target nodes;
dynamically updating the visualization by filtering connections and nodes based on the selected label; and
providing the updated visualization for display.

9. The method of claim 8, wherein the updated visualization highlights a subset of the first and second sets of geometric shapes that represent the subset of the source nodes and target nodes, and also highlights a subset of the third geometric shapes representing ports that provide connections between the subset of the source nodes and target nodes.

10. The method of claim 1, further comprising:
receiving a selection of a port;
dynamically updating the visualization by filtering connections and nodes based on the selected port; and
providing the updated visualization for display.

11. The method of claim 10, wherein the updated visualization highlights a geometric shape of the third set of geometric shapes that represents the selected port, and also highlights a subset of the first and second sets of geometric shapes that represent source nodes and target nodes that have connections via the selected port.

12. A non-transitory computer-readable medium comprising stored instructions for providing a visualization of a segmented network, the instructions, when executed by a computing system, causing the computing system to:
obtain data indicating connections between nodes in the segmented network, the data generated by evaluating network traffic flows in the segmented network using enforcement modules installed on workloads in the segmented network;
generate a visualization having a first axis and a second axis, the visualization including:
a first set of geometric shapes representing source nodes are displayed in a first portion of the visualization;
a second set of geometric shapes representing target nodes are displayed in a second portion of the visualization; and
a third set of geometric shapes representing ports are displayed closer to the first portion along the first axis responsive to having a greater number of connections to source nodes than target nodes and closer to the second portion along the first axis responsive to having a greater number of connections to target nodes than source nodes; and
causing display of the visualization on a screen of a computing device.

13. The non-transitory computer-readable medium of claim 12, wherein:
the ports are positioned along the second axis of the visualization based on a corresponding port number;
a size of a particular geometric shape of the third set of geometric shapes is based on a total number of connections between the port represented by the geometric shape and the source nodes and target nodes; and the first portion is a first side of the visualization and the second portion is a second side of the visualization, the second side opposite the first side with respect to the first axis.

14. The non-transitory computer-readable medium of claim 12, wherein the visualization further includes lines representing connections in the network between the source and target nodes via the ports, wherein a connection between a particular source node and a particular target node via a particular port is represented by a first line connecting a first geometric shape that represents the particular source node to a second geometric shape that represents the particular port and a second line connecting the second geometric shape that represents the particular port to a third geometric shape that represents the particular target node.

15. The non-transitory computer-readable medium of claim 12, wherein the visualization further includes additional geometric shapes indicating labels from a segmentation hierarchy applied to at least some of the source nodes and target nodes, wherein the additional geometric shapes identify a subset of the first set of geometric shapes and second set of geometric shapes that represent source nodes or target nodes each sharing a corresponding label.

16. The non-transitory computer-readable medium of claim 15, wherein the first set of geometric shapes or the second set of geometric shapes are arranged in a first arc, and at least one of the additional geometric shapes is arranged along a second arc, adjacent to the first arc, and has a length along the second arc that spans a plurality of the first or second set of geometric shapes, thus indicating that the plurality of the first or second set of geometric shapes share the corresponding label.

17. The non-transitory computer-readable medium of claim 12, wherein the instructions further comprise instructions that cause the computing system to:
receive a selection of a label that is applied to a subset of the source nodes and target nodes;
dynamically update the visualization by filtering connections and nodes based on the selected label; and
provide the updated visualization for display.

18. The non-transitory computer-readable medium of claim 17, wherein the updated visualization highlights a subset of the first and second sets of geometric shapes that represent the subset of the source nodes and target nodes, and also highlights a subset of the third geometric shapes representing ports that provide connections between the subset of the source nodes and target nodes.

19. The non-transitory computer-readable medium of claim 12, wherein the instructions further comprise instructions that cause the computing system to:
receive a selection of a port;
dynamically update the visualization by filtering connections and nodes based on the selected port; and
provide the updated visualization for display.

20. The non-transitory computer-readable medium of claim 19, wherein the updated visualization highlights a geometric shape of the third set of geometric shapes that represents the selected port, and also highlights a subset of the first and second sets of geometric shapes that represent source nodes and target nodes that have connections via the selected port.

\* \* \* \* \*